United States Patent
De Mello et al.

(10) Patent No.: US 7,252,814 B2
(45) Date of Patent: Aug. 7, 2007

(54) PREPARATION OF NANOPARTICLES

(75) Inventors: Andrew De Mello, Twickenham (GB);
John De Mello, Teddington (GB);
Joshua Edel, Hendon (GB)

(73) Assignee: Imperial College of Science, Technology and Medicine, London (GB)

( * ) Notice: Subject to any disclaimer, the term of this patent is extended or adjusted under 35 U.S.C. 154(b) by 0 days.

(21) Appl. No.: 10/501,301

(22) PCT Filed: Jan. 13, 2003

(86) PCT No.: PCT/GB03/00108

§ 371 (c)(1),
(2), (4) Date: Dec. 13, 2005

(87) PCT Pub. No.: WO03/057362

PCT Pub. Date: Jul. 17, 2003

(65) Prior Publication Data

US 2006/0087048 A1     Apr. 27, 2006

(30) Foreign Application Priority Data

Jan. 14, 2002    (GB)   ................................ 0200744.1

(51) Int. Cl.
*C01B 17/20*     (2006.01)
*C30B 35/00*     (2006.01)

(52) U.S. Cl. ................. 423/566.1; 422/129; 422/245.1

(58) Field of Classification Search ............. 423/566.1, 423/509, 610; 422/129, 245.1
See application file for complete search history.

(56) References Cited

U.S. PATENT DOCUMENTS

| 5,652,192 A | | 7/1997 | Fulton et al. | |
|---|---|---|---|---|
| 5,665,277 A | | 9/1997 | Hwang | |
| 6,036,927 A | * | 3/2000 | Chatterjee et al. | .......... 422/211 |
| 6,068,800 A | | 5/2000 | Denney et al. | |
| 6,537,506 B1 | * | 3/2003 | Schwalbe et al. | ........... 422/130 |
| 2004/0025634 A1 | * | 2/2004 | Nakamura et al. | ............ 75/335 |

FOREIGN PATENT DOCUMENTS

DE          199 25 184       11/2000
WO      WO 00/23181     4/2000

OTHER PUBLICATIONS

English abstract of DE 199 25 184 A1 published Nov. 30, 2000.*
Mockel, Hermann et al, Formation of uniform size anatase nanocrystals from bis(ammonium lactato)titanium dihydroxide by thermohydrolysis, J. Mater. Chem, 1999, 9, 3051-3056.
Mahtab, Rahina et al, Preferential Adsorption of a "Kinked" DNA to a Neutral Curved Surface: Comparisons to and Implications for Nonspecific DNA-Protein Interactions, J. Am. Chem. Soc. 1996, 118, 7028-7032.

* cited by examiner

*Primary Examiner*—Timothy C. Vanoy
(74) *Attorney, Agent, or Firm*—Warner Norcross & Judd LLP

(57) ABSTRACT

The present invention provides a method and apparatus for the production of nanoparticles using a continuous flow miniaturised reaction vessel. In particular, the invention provides a method for preparing nanoparticles by a direct one-stage process.

10 Claims, 3 Drawing Sheets

PREPARATION OF NANOPARTICLES

The present invention provides a method for the production of nanoparticles using a continuous flow miniaturised reaction vessel.

Nanocrystalline semiconductors are of considerable scientific and commercial interest owing to their tuneable optical and electronic properties, and their potential applications in a wide range of electronic devices. Physical characteristics of nanocrystallites are determined primarily by spatial confinement effects with properties such as the optical band gap often differing considerably from the bulk semiconductor. As these properties are ultimately determined by the physical size and shape of the crystallites, there is considerable interest in processing routes that yield nanoparticles of well-defined size.

Known techniques for producing near monodisperse nanoparticles or nanoparticles of a well-defined size are relatively complex. Usually, the nanoparticles are produced in two stages: a poly-disperse sample of nanoparticles is first obtained using standard synthetic routes. Isolation of nanoparticles of a given particle size can then be performed by means of repeated recrystallisations. This method is time consuming due to the need for repeated recrystallisations and results in low product yields. In addition, this method is not amenable to industrial or commercial scale up. This approach is therefore suitable only for the production of nanoparticles in a research environment.

The first aspect of the invention provides a method for the preparation of nanoparticles using a continuous flow miniaturised reaction system.

The continuous flow format utilises a miniature reaction vessel wherein products are continuously extracted and reactants continuously replenished. The present invention utilises a microfluidic reaction vessel wherein the reactant and product samples are transported and manipulated through one or more channels wherein the channels have a cross-section of from approximately 1000 microns to approximately 0.1 microns.

As previously discussed, the present invention involves the use of a miniature reaction vessel. For the present invention, the reaction vessel has a reaction volume of between $1\times10^{-5}$ to $1\times10^{-11}$ liters preferably $1\times10^{-6}$ to $1\times10^{-10}$ liter, more preferably $1\times10^{-7}$ to $1\times10^{-9}$ liter. It will be appreciated that the actual volume of the reaction vessel may be greater than the reaction volume utilised for the production of nanoparticles. For example, the reaction vessel may have a total volume of $5\times10^{-7}$ liters, while a reaction volume of $1\times10^{-8}$ liters or above is used.

The reduced reaction volume of the reaction vessel allows;

Rapid mixing of the reactants (via a diffusive process)
Chemical homogeneity through the reaction volume; and
Temperature homogeneity through the reaction volume.

Since any variations in local conditions are liable to cause variations in crystalline size, this allows the production of nanoparticles of uniform size and chemical composition.

The continuous flow system of the invention provides nanoparticles in sufficient quantities for commercial and industrial use. The continuous flow system allows the constant supply of reactants and the constant removal of product. It is therefore possible to run the continuous flow system in a constant manner or for specified periods of time to obtain the required yield of nanoparticles. The continuous flow system also allows recycling of unreacted or partially unreacted starting materials into the reaction vessel to increase the yield and efficiency of the reaction method.

Thus it will be appreciated that while the instantaneous reaction volume of the reaction vessel may be small, the volume of the reactants and ultimately product passing through the reaction vessel may be significant. In addition, two or more reaction vessels can be connected in parallel and provided with the reactants. The number of reaction vessels connected in parallel or the number of connected reaction vessels supplied with reactants can be varied depending on the quantity of nanoparticles required.

The continuous flow system allows the constant recovery of product, as it is not necessary to halt the production to isolate or purify the reaction mixture. It will be appreciated however that the recovered product may undergo purification as required. The present invention therefore provides a method for the production of nanoparticles which is more time efficient, capable of commercial and/or industrial application and which provides nanoparticles in high yield.

The present invention provides a method for preparing monodisperse nanoparticles by a direct one-stage process. This method provides nanoparticles of a defined size due to the uniform temperature and chemical homogeneity within the reaction vessel without need for further isolation by recrystallisation. This technique is well suited to commercial or industrial production of nanoparticles as the nanoparticles are directly isolated from the production method without the need for further isolation or purification (for example by recrystallisation).

The precise control of the reactants and product within the reaction vessel allows the interruption of chemical reactions and allows the isolation of a particular nanoparticle size as required. Thus the present invention provides a method for the preparation of a nanoparticle of a well-defined size. The ability to provide nanoparticles of a defined size is of particular importance for the use of the nanoparticles in electronic devices, as the optical properties of the nanoparticles is influenced by their size.

For the purposes of this invention, the term "monodisperse" relates to a narrow distribution of particle diameters within a population of nanoparticles. It will be appreciated that the operational definition of narrow will be dependent on the precise application but will typically relate to a size distribution with a variance of up to $\pm20\%$, preferably a size distribution with a variance of up to $\pm10\%$, more preferably with a variance of around $\pm2\%$.

The method of the present invention can be used to produce nanoparticles of varying chemical compositions. Examples of such nanoparticles include cadmium sulphide, cadmium selenide, anatase titanium dioxide and zinc sulphide.

In an alternative feature of the first aspect, there is provided a method for simultaneously producing nanoparticles of systematically varying sizes (i.e. polydisperse). This method involves the manipulation of the physical or chemical conditions within the reaction vessel by the production of a gradient across the reaction vessel. Variations of the physical conditions within the reaction vessel include the production of a concentration gradient, a temperature gradient, a pH gradient, or a gradient of the intensity of optical illumination. This method allows the use of combinatorial or array-style synthesis production techniques.

In particular, this method allows the formation of nanoparticles having a defined size range in a one step process. Such a method can be used to provide nanoparticles of defined sizes in a continuous and therefore cost effective and time efficient manner. Manipulation of the conditions within the reaction vessel allow the production of nanoparticles of defined size or sizes and composition.

In a second aspect, the present invention further provides a nanoparticle as produced by the method of the first aspect.

A third aspect of the present invention provides a nanoparticle production device comprising one or more inlets, a reaction chamber and one or more outlets. For the purposes of this invention, the device can comprise two or more reaction chambers connected in parallel supplied by one or more inlets and one or more outlets. The reaction vessel can also include heating and/or cooling means to provide a temperature gradient across the reaction vessel. The reaction vessel may further be provided with illumination means.

BRIEF DESCRIPTION OF THE DRAWINGS

The invention may be put into practice in various ways and a number of specific embodiments will be described by way of example to illustrate the invention with reference to the accompanying drawings, in which.

DETAILED DESCRIPTION OF THE INVENTION

In order to provide nanoparticles of uniform distribution, it is necessary to maintain the chemical homogeneity of the reaction mixtures within the reaction vessel. This is particularly important for reactions wherein the rate of reaction is of the same order or much shorter than the mixing time of the reactants. In a preferred feature of the first aspect, the miniature reaction vessel is fitted with a fast micromixer such as a continuous flow micromixer as described below.

Figure 1:
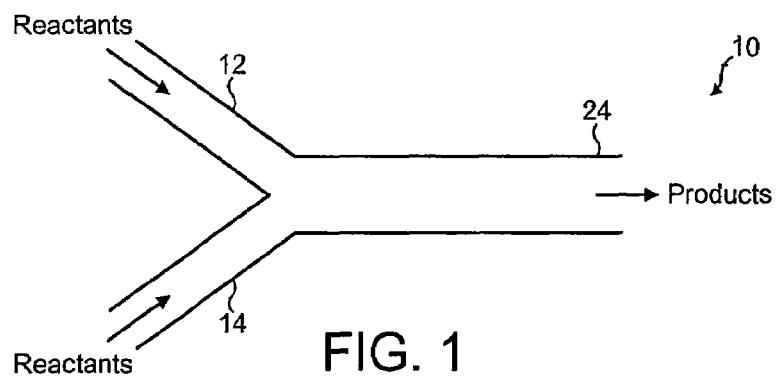
FIG. 1 shows a schematic representation of a continuous flow method in which reactants are continuously supplied to a reaction chamber and the resulting product is continuously removed therefrom.
Figure 2:
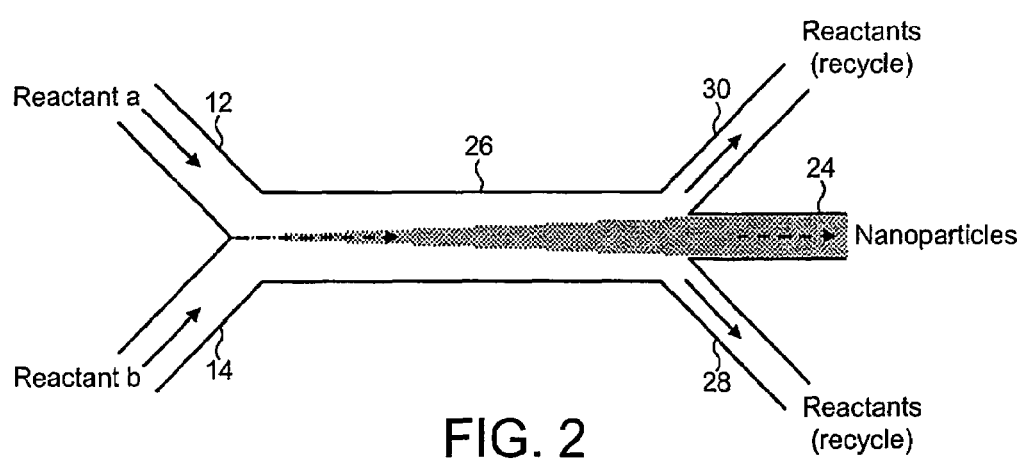
FIG. 2 shows a schematic representation of a continuous flow method in which the reactants are recycled back into the reaction vessel.
Figure 3:
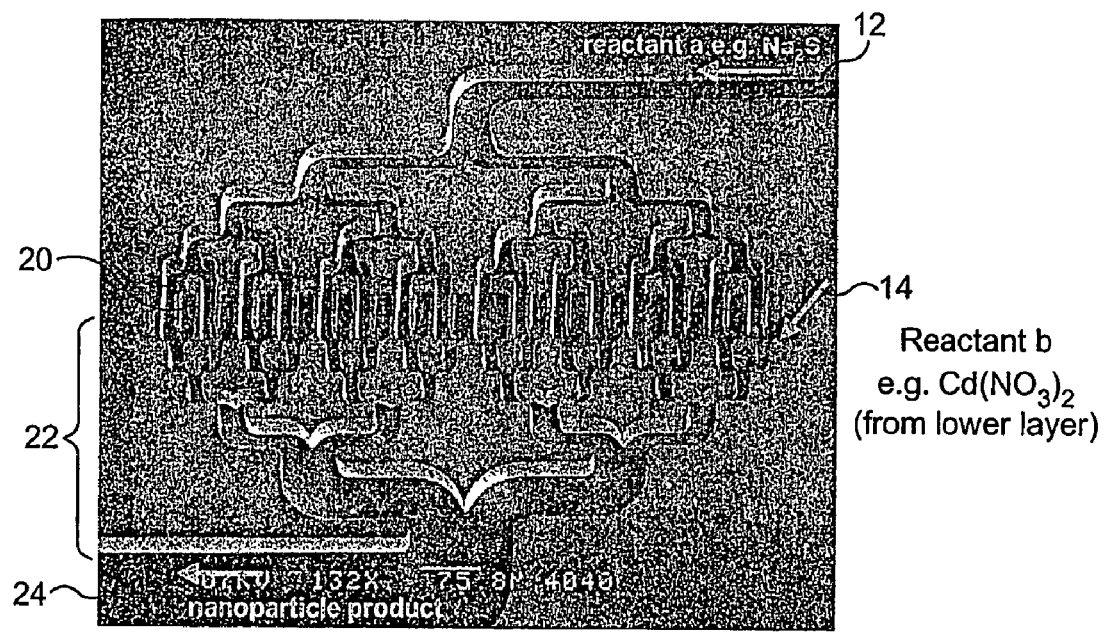
FIG. 3 shows the central portion of a micromixer chip wherein two inlet flows containing reactants are split into 16 partial flows (one inlet arrives from a lower layer (not shown)). After mixing the channels are then sequentially recombined in a reverse network until all partial flows are united in one broad outlet channel.

Referring to FIG. 1, the continuous flow micromixer 10 comprises two inlet flows 12, 14 (each containing one of the reactants) split into a series of separate multichannel streams 20 (shown in more detail in FIG. 3) (16 partial flows) before bringing them back into final contact. As the diffusion time of the reactants which in the stream is proportional to the diffusion distance, splitting each reagent stream into n substreams of similar width decreases mixing times by a factor $n^2$. After mixing, the channels are then sequentially combined in a reverse network 22 until all partial flows are united in one broad outlet channel 24. As shown in FIG. 2, unreacted or partially reacted reactants can be recycled back into the reaction chamber 26 via outlets 28,30.

Figure 6:
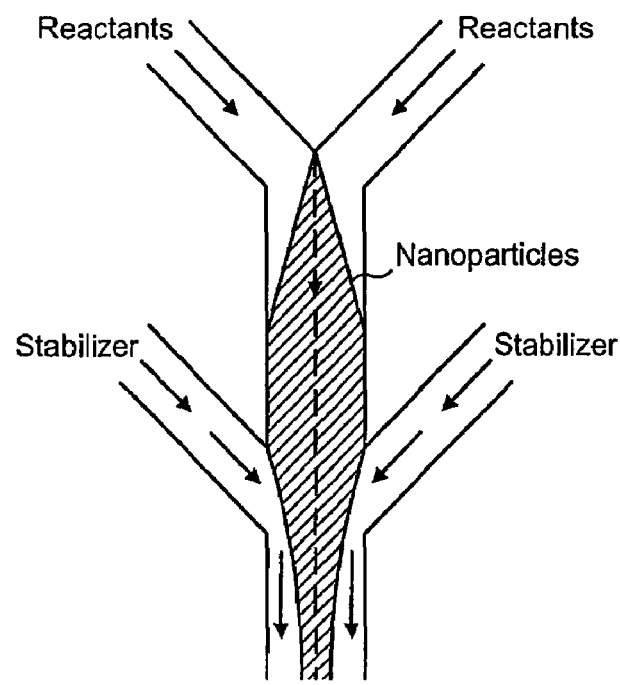
FIG. 6 shows a schematic representation of a continuous flow method in which a stabilising agent is added to the nanoparticles after nanoparticle formation.

In order to provide monodisperse nanoparticles, it is necessary to prevent coalescence of the nanoparticles during and after their formation. This is achieved by isolation of the nanoparticles from the reaction mixture. This prevents coalescence of the newly formed nanoparticles to form larger crystallites. Monodisperse nanoparticles can also be obtained by stabilising the nanoparticles, for example by the addition of one or more stabilising agents via an additional flow channel or by exposing the isolated nanoparticles to one or more stabilising agents. FIG. 6 illustrates stabilisation of the formed nanoparticles by addition of a stabilising agent after nanoparticle formation. In one embodiment of the present invention a further chemical species is added to the reaction mixture to stabilise the formed nanoparticles. Examples of such chemical species include sodium polyphosphate, tributylphoshine oxide, pyridine, octanethiol and thiourea. It is also possible to prevent coalescence and hence polydispersity of the nanoparticdes by increasing the flow rates of the reactants into and through the reaction vessel. For the purposes of the present invention reactants are provided into and through the reaction vessel at a flow rate of 10 nL/min to 5 ml/min, preferably up to 2 ml/min. More preferably reactants are provided out at volumetric flow rates of 10 microlitres/min to 500 microlitres/min.

The present invention provides nanoparticles of uniform and defined size. Such nanoparticles can be used as optical moieties in for example nanocrystalline semiconductors. The composition of the nanoparticles is not limited and can include cadmium sulphide, cadmium selenide or zinc sulphide.

The reactants for the present invention can be carried out in aqueous or organic solvents. It will be appreciated that the reaction vessel should be selected for its compatibility with the solvent of the reaction (i.e. aqueous reaction solvents allow the use of plastic reaction vessels while some organic solvents will require the use of quartz, metallic or glass reaction vessels).

The present invention further provides a method for the simultaneous production of nanoparticles of systematically varying sizes. This is provided by the establishment of spatial variations in the reaction conditions (such as pH, temperature, reagent concentration, intensity of optical illumination) inside the reaction vessel. These variations enable the use of "combinatorial" or "array-style" synthesis techniques for the simultaneous production of nanoparticles of systematically varying sizes.

Figure 4:
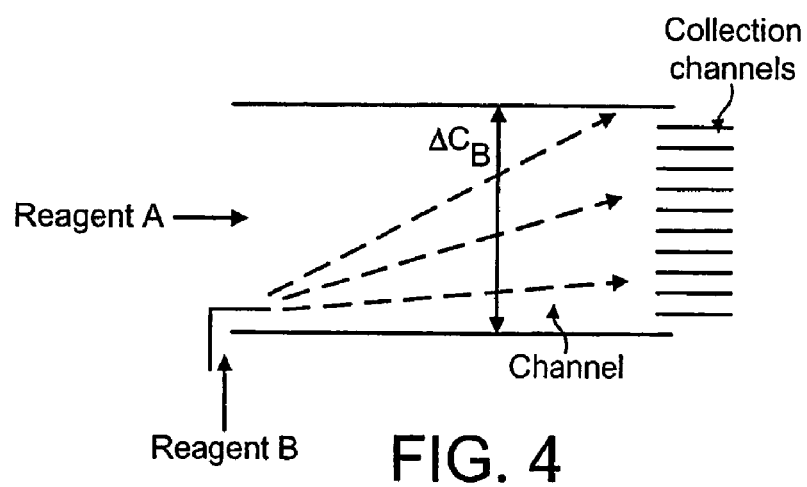
FIG. 4 shows a schematic representation of a continuous flow method in which a concentration gradient perpendicular to the channel is established by the diffusion of Reagent B orthogonal to the primary flow direction. This results in the concentration of Reagent B decreasing steadily across (i.e. orthogonal) to the channel.

As illustrated in FIG. 4, diffusion of Reagent B orthogonal to the primary flow direction is used to establish a concentration gradient perpendicular to the channel, with the concentration of Reagent B decreasing steadily across (i.e. orthogonal to) the channel. This leads to a consequent (and systematic) variation in the relative concentrations of Reagents A and B across the channel. Reagents A and B react to form nanoparticles and therefore nanoparticles formed at different locations transverse to the flow profile are produced under systematically varying conditions which in turn leads to systematic variations in size and/or particle shape. The primary flow channel can be subsequently subdivided into narrow sub-streams Or collection channels (as shown in FIG. 4) with each collection channel containing a well-defined distribution of nanoparticles with systematically varying mean size (or shape).

Figure 5:
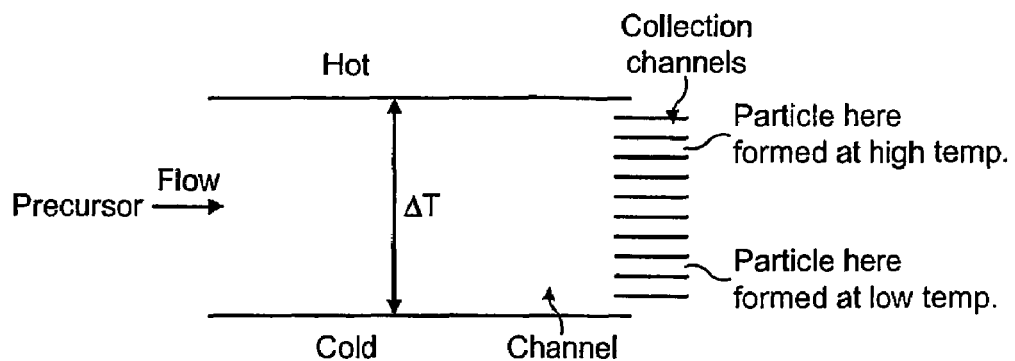
FIG. 5 shows a schematic representation of a continuous flow method in which a linear temperature gradient is established orthogonal to the primary flow direction by holding the two sides of the channel at different temperatures.

FIG. 5 illustrates an alternative embodiment in which a linear temperature gradient is established orthogonal to the primary flow direction by holding the two sides of the channel at different temperatures. Alternatively, the channel may be placed on top of a metal bar across which a temperature gradient already exists. This establishes a similar temperature gradient across the channel. As before nanoparticles formed at different locations transverse to the flow channel experience different reaction conditions leading to systematic variations in size and/or particle shape. This procedure is well suited to thermally-initiated nanoparticle synthesis procedures such as the formation of anatase titanium dioxide nanoparticles via the thermal decomposition of bis(ammoniumlactato)titanium dihydroxide (ALT). ALT decomposes to form anatase particles and the by-product ammonium lactate (HAL) as described by Möckel et al, *J. Mater. Chem.*, 9, 3051, (1999) when its temperature is raised to above 120° C. A thermal variation of e.g. 100° C.-300° C. across the channel leads to the production of anatase nanoparticles of systematically varying size and/or shape. The width of the temperature zone and/or the flow rate may be used to vary the reaction time.

It will be appreciated that the components required to put the present invention into effect will be well-known to a person skilled in the art.

The present invention will now be described with reference to the following non-limiting example.

EXAMPLE

CdS nanoparticles were obtained by directly mixing $4 \times 10^{-4}$ aqueous solutions of $Cd(NO_3)_2$ $4H_2O$ and $Na_2S$ (Mahtab R.; Rogers J. P.; Singleton C. P.; Murphy C. J.; Am. Chem. Soc. 1996, 118, 7028-7032). To aid stabilisation of the resulting nanoparticles, an equal quantity of sodium polyphosphate was added to the cadmium nitrate solution prior to mixing. A syringe pump was used to deliver the reagents into the microfluidic channel network at various flow rates (10-300 μL/min). The outlet flow from the distributive mixer chip was coupled to a quartz flow cell (10 mm pathlength) and absorption spectra were obtained using a Perkin-Elmer, Lambda 15 UV-Vis spectrometer.

The invention claimed is:

1. A method of producing crystalline nanoparticles using a continuous flow miniaturised reaction vessel, wherein the reaction vessel comprises at least one inlet, a reaction chamber and at least one outlet, the method comprising:
   supplying a continuous reactant flow to the reaction chamber via the inlet;
   controlling physical and chemical conditions in the reaction chamber so that reaction occurs to form crystalline nanoparticles of a pre-selected, defined dimension; and
   continuously extracting the formed crystalline nanoparticles from the reaction chamber via the outlet.

2. The method of claim 1 wherein the reaction vessel has a reaction volume of from 1×10-5 to 1×10-11 liters.

3. The method of claim 1 comprising combining an aqueous solution of a cadmium salt and a sulphide salt in the continuous flow miniaturized reaction vessel to produce a plurality of cadmium sulphide nanoparticles.

4. The method of claim 1 wherein a stabiliser is added after the formation of the nanoparticles.

5. The method of claim 1 wherein the nanoparticles produced by the reaction vessel are monodisperse.

6. The method of claim 1 wherein a spatial variation in at least one reaction condition is established within the reaction vessel.

7. The method of claim 6 wherein at least one reaction condition varied is at least one of reagent concentration, pH, temperature, and intensity of optical illumination provided at varying concentrations.

8. The method of claim 7 wherein the nanoparticles produced are of varying defined dimension.

9. A miniaturised crystalline nanoparticle production device comprising:
   at least one inlet,
   a reaction chamber that receives a reactant flow sufficient to form crystalline nanoparticles;
   at least one outlet, and at least one of a temperature varying element that produces a temperature gradient across the reaction chamber so that the formed crystalline nanoparticles are of varying predetermined dimensions, an illumination element that produces an optical illumination intensity gradient across the reaction chamber so that the formed crystalline nanoparticles are of varying predetermined dimensions, and an inlet positioned to provide an off-center continuous reactant flow into the reaction chamber to produce a pH gradient and/or reactant concentration gradient across the reaction chamber so that the formed crystalline nanoparticles are of varying predetermined dimensions,
   wherein the device is arranged to allow the continuous reactant flow into the reaction chamber and to allow a continuous flow of formed crystalline nanoparticles out the outlet.

10. A miniaturised crystalline nanoparticle production device comprising:
    a reaction chamber;
    a first inlet for supply of at least one reactant adapted to form a crystalline nanoparticulate product to the reaction chamber;
    a first outlet for extraction of the crystalline nanoparticulate product from the reaction chamber;
    a second outlet for extraction of unreacted or partially reacted reactant from the reaction chamber; and
    a second inlet for recycling of the unreacted reactant or partially reacted reactant into the reaction chamber.

* * * * *